3,293,111
COATED POLYOLEFIN ARTICLES AND PROCESS
OF MAKING SAME
George C. McCormick, Burlington, N.J., assignor to
Thiokol Chemical Corporation, Bristol, Pa., a corporation of Delaware
No Drawing. Filed Oct. 1, 1962, Ser. No. 227,530
11 Claims. (Cl. 161—184)

The present invention relates to novel coated polyolefinic articles and to the novel process whereby they may be obtained. In particular, this invention relates to novel articles comprising a substrate and a cured organic coating bonded thereto, wherein the substrate is a polyolefinic material such as a polyethylene or a polypropylene film or an ethylene-propylene rubber, and the coating is a reaction product of polyepoxides and copolymers of vinylidene chloride and at least one α,β-unsaturated carboxylic acid or anhydride. This invention also relates to the novel process whereby these novel articles may be obtained.

An object of this invention is to provide novel coated polyolefinic articles in which the qualities of impermeability to the transmission therethrough of water vapor and grease are substantially improved.

Another object of this invention is to provide novel coated polyolefinic articles which may be heat and pressure laminated to other substrate materials without the use of a prime coat or anchoring agent, the coating acting as an interlayer between the polyolefin substrate and other substrate.

Yet another object of this invention is to provide novel, heat sealable, coated polyolefin articles.

Although the coating of polyolefinic articles, such as films, useful as flexible packaging materials, and polyolefinic rubbery goods is not new to the arts (U.S. 3,031,332 and Italian 597,540), each specific olefinic material acting as substrate has provided different and substantial problems to the coating or use thereof, such as inadequate adhesion of the coating per se to the polyolefinic substrate requiring in remedy thereof, use of separate "anchoring agents" through which both the substrate and coating may be joined. Many of the coated polyolefinic materials known cannot be heat sealed, or in turn securely laminated in and of themsleves to other substrates. Many coated polyolefinic articles now known do not provide substantial improvement in properties over the polyolefinic substrates themselves as effective barriers to the passage therethrough of water vapor and/or grease. These difficulties, many of which are not resolvable in the prior art, are now substantially alleviated through the novel articles and process of the present invention.

It has been unexpectedly discovered, according to the present invention, that where the present novel articles are formed consisting essentially of a polyolefinic substrate, such as polyethylene or polypropylene film, or ethylene-propylene rubber, etc. and an organic coating bonded thereto formed by the reaction products of polyepoxides and copolymers of vinylidene chloride and at least one α,β-unsaturated carboxylic acid or anhydride that the aforementioned difficulties are substantially alleviated, and that novel articles are easily and economically provided which have coatings which are heat sealable; which allow the coated substrate to be readily laminated to other substrates; which provide effective barriers to the passage therethrough of water vapor and/or grease, and which do not require the aid of an anchoring agent in the coating of the substrate therewith.

The copolymers are preferably formed by means of a free radical polymerization reaction using about 0.1 to 4% by weight of a catalyst such as azobisisobutyronitrile or benzoyl peroxide. The reaction is preferably conducted in a solution in a solvent such as methylisobutylketone, methyl ethyl ketone, acetone or 50/50 (by volume) acetone/toluene. The polymerization may also be conducted in a solvent such as hexane, methanol or isopropanol in which case the polymer precipitates out to form a slurry. The polymerization reaction may also be conducted using suspension and emulsion polymerization techniques. The copolymers produced should preferably be freed of heavy metal contaminants, such as iron, for stability purposes.

The vinylidene chloride copolymers of the present invention are relatively low molecular weight particulate materials which contain about 75 to 95 and preferably about 85 mol percent of vinylidene chloride and about 5 to 25 and preferably about 15 mol percent of at least one unsaturated α,β carboxylic acid such as acrylic, methacrylic, itaconic and crotonic acids or anhydrides of such acids. They are random copolymers which are soluble in selected solvents such as tetrahydrofuran, ethyl acetate, acetone, methyl ethyl ketone, methyl isobutyl ketone, dimethyl formamide and dioxane and cosolvent systems such as those containing at least 50% by volume of tetrahydrofuran and at least one solvent diluent such as toluene and methylene chloride.

The polyepoxides which may be used in the novel processes of the present invention are those which contain an average of more than one epoxide

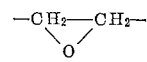

group per molecule and which are soluble in the desired solvent. Generally speaking, all the polyepoxide materials commercially available today may be used in the processes of the present invention, whether they are solid or liquid materials. The polyepoxy materials which can be cured with the above described copolymers are preferably those materials which have an average epoxy functionality of more than one and preferably they are materials which contain an average of at least approximately two epoxide groups per molecule of the polyepoxy material. The position of the epoxide groups in the polyepoxy material is not critical. For instance, if the polyepoxy material is essentially linear in structure the epoxide groups may be in a terminal position or they may be positioned intermediately and/or randomly along the linear structure. Polyepoxy materials which may be cured with the above defined copolymers include the following types of materials:

(1) Essentially linear types such as

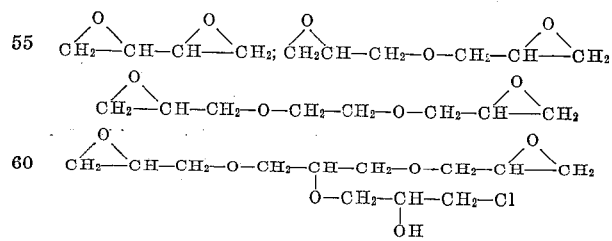

homopolymers and copolymers of glycidyl acrylate and preferably a copolymer of vinylidene chloride and glycidyl acrylate and the epoxidized polybutadiene materials such as those which have an epoxide functionality of four or more and which are sold by Food Machinery Corporation under the designation "Oxiron" resins (i.e., "Oxiron 2000," "Oxiron 2001" and "Oxiron 2002").

(2) Bisphenol A/epichlorohydrin types which are aromatic in nature and which include those sold by the Thiokol Chemical Corporation under the trademark designation "Timpox" (i.e., "Timpox A"; "Timpox B"; "Timpox C"), those sold by the Shell Chemical Company under the designation "Epon" resins, i.e., "Epon 828" and those sold by Union Carbide Chemicals Company under the designation "Bakelite ERL" resins.

(3) Cyclo aliphatic types which includes thos sold by Union Carbide Chemicals Company under the designation "Unox" resins, i.e. "Unox 206," which is epoxy ethyl-3,4-epoxy cyclohexane, "Unox 201" and "Unox 221," which are 3,4-epoxy-6-methylcyclohexylmethyl-3,4-epoxy-6-methylcyclohexane-carboxylate, and "Unox 289," which is bis(3,4-epoxy-6-methylcyclohexylmethyl)adipate.

(4) Resorcinol diglycidyl ether types which include those sold by Koppers Chemical Corporation under the designation "Kopoxite" resins (i.e., "Kopoxite 159").

(5) Epoxy novalak types (alkyl novalak resins) which is a phenolic/epoxy type system and which includes the resins sold by Dow Chemical Corporation under the designation "Dow Epoxy Novalak 438" or "DEN 438–EK 85" which contains 85% of the resin and 15% methyl ethyl ketone as a solvent and the resins sold by Koppers Chemical Corporation under the designation "Ker" resins (i.e., "Ker 357A" and "Ker 955A").

(6) Epoxidized fatty acid resins including the Epoxol materials sold by Swift and Company such as "Epoxol 9–5" (epoxidized linseed oil) and "Epoxol 7–4" (epoxized soy bean oil; the "Flexol" resins sold by Union Carbide Chemical Company, such as "Flexol EP8" (2-ethyl hexyl epoxy tallate), "Flexol EPO" (epoxidized soy bean oil) and "Flexol TPO" (epoxidized soy bean oil; and "Paraplex G62" (epoxidized soy bean oil) sold by Rohm and Haas.

(7) Epoxidized silicone oil types such as that marketed by Dow Corning under the trade name "Epoxy Silicone QZ," e.g., Epoxy Silicone QZ8–0914.

The higher the functionality of the polyepoxide compound, the tighter the cure that is obtained usually, all other factors remaining the same and for some applications such higher functional polyepoxide materials are preferred. The use of glycidyl acrylate copolymers, such as, a copolymer of vinylidene chloride and glycidyl acrylate is preferred in those applications where a less plasticized coating is desired for better coating surface properties.

"Tipox B" resin is preferred for those coatings requiring good clarity and heat sealing properties.

The polyepoxide/copolymer solution systems of the present invention offer unique handling and processing advantages to the trade. They are essentially one package curing systems and some notably those made with vinylidene chloride/glycidylacrylate copolymers are stable for extended periods of time. Their solids content can be readily varied to meet the need for various types of applications. Those in the trade seem to prefer a solution having a solids content of about 15 to 35% by weight. By solids content it is meant the percent by weight of those components of the solutions which are not solvents, even though one or more of the other components, such as the polyepoxide materials, may be liquid under normal conditions.

The solution nature of these ssytems also provides for a facile incorporation therein of adjuvant materials such as pigments, dyes, delustrants, plasticizers, waxes, fillers, stabilizers, etc., when desired. Solvents which may be used in the preparation of the coating solutions of the present invention include the common organic solvents known to those in the art such as methyl ethyl ketone, tetrahydrofuran, methyl isobutyl ketone, cellosolve acetate, diacetone alcohol, toluene, chloroform, acetone, cyclohexanone, methanol, butyl cellosolve acetate, trichloroethylene, ethanol, dimethyl formamide, methylene chloride, xylol, dioxane, benzene, butyl acetate and Solvesso 150 a commercially available hydrocarbon solvent blend used alone or in combination with one another. The preferred solvent is a 50/50 by volume mixture of ethylacetate and methyl ethyl ketone. The use of this solvent tends to produce the clearest coatings.

In the coating process according to the present invention a solution containing the polyepoxide and the copolymer is applied to the surfaces of the polyolefin substrate on one or more sides thereof as desired so as to provide each surface being coated with a film which can be as low as 0.01 mils in thickness after the removal of the solvent therefrom. The thickness of the film may be varied by varying the coating system being used as well as by varying the viscosity of the coating solution. The coatings may be applied by any of the commonly used dipping, brushing, roller coating, etc., techniques known to the art. The viscosity of the coating solution may be varied to suit the manner of application by adjusting the solids content of the coating solution. After the coating solution is applied to the substrate the solvent is removed therefrom preferable at elevated conditions of up to 250° F. and with forced draft conditions. The temperatures to be employed depend not only on the solvent and/or thickness of the desired coating but on the type of substrate involved as well, i.e., film or a more thicker object; as well as on the properties of the olefin materials itself i.e., density of the olefin and in case of film substrates, the temperature used also depends on whether or not the film used is of the cast or oriented variety. At the higher temperatures the removal of the solvent and the simultaneous crosslinking of the copolymer and the polyepoxide can be accomplished in a matter of seconds. At lower temperatures a longer time is required to remove the solvent and cure the coating. Much better adhesion of the coatings to olefin films is obtained if the coating is applied to the side(s) of the film which are "treated." "Treated film" as used in the context of the present invention means film having one or both sides thereof roughened or etched by physical, electrical (U.S. 3,018,189) or chemical means to provide a better anchoring surface for the coating. The crosslinking reaction involves the reaction of the carboxyl groups of the copolymer with the epoxy groups of the polyepoxide. About 0.01 to 2.5 and preferably about 0.1 to 1.0 mol of epoxide moieties should be provided per mol of carboxyl moieties to insure adequate crosslinking sites. Catalysts such as tertiary amines, $BF_3$ and $BF_3$ complexes may be used to facilitate the crosslinking reaction when using certain of the polyepoxide materials such as the epichlorohydrin/bisphenol A type. Useful products may be obtained with these polyepoxides, however, without the use of such catalysts.

The coatings produced according to the present invention are normally crosslinked and/or chain extended into a very high molecular weight form with the application of heat, yet they retain very excellent heat sealing properties.

The coatings prepared according to the present invention have much better solvent, grease and scratch resistant properties and are much more resistant to the passage of moisture therethrough than the coatings presently available largely due to the crosslinked and/or chain extended nature of the coatings of the present invention.

The carboxylic acid moieties supply the copolymers of the present invention, for the most part, with its solubility properties in addition to supplying the copolymer with the carboxyl groups needed to subsequently anchor the coating to the polyolefin substrate and crosslink with the epoxy groups of the polyepoxide compounds. The solubility of the copolymers can also be varied, if desired, by varying the molecular weight of the copolymer. The vinylidene chloride units of the copolymer help to supply the needed vapor impermeability and grease resistant properties to the crosslinked coating. The polyepoxide materials supply the epoxide groups needed to crosslink the carboxyl groups of the copolymer. It is the crosslinked and/or chain extended nature of the coatings of the present invention which provides its excellent solvent resistant properties. The polyepoxide materials also probably imparts adhesive and plasticized properties to the cured coating. The liquid polyepoxides also act as cosolvents for the copolymer. It can be readily seen, therefore, that the novel structures of the present invention provide those in the art with a versatile coating system, the components and/or amounts of the components of which can be readily changed so as to provide for the needs of a vast variety of end use applications.

The following examples are merely illustrative of the present invention and are not intended as a limitation upon the scope thereof.

Examples 1–15

Among the vinylidene chloride copolymers which may be used to form part of the curable compositions useful in the practice of the present invention are those of vinylidene chloride ($CVl_2$) and acrylic acid (AA). Curable copolymers made from those monomers were prepared by solution polymerization as illustrated in Tables I and II below. They represent a wide range of compositions, produced using several solvent systems, e.g., solvent A=methylisobutylketone; solvent B=acetone; solvent C=1:1 vol/vol mixture of acetone and toluene, solvent D=methylethyl ketone and several free radical polymerization initiators, e.g., initiator A=azobisisotbutyronitrile; initiator B=benzoyl peroxide, under various polymerization conditions of temperature and time, to provide reactive copolymers at various percentages of conversion of the monomers. In preparing these copolymers, the respective initiators were dissolved in the solvent used and the monomers were then added to the initiator solution. The reactions were conducted under nitrogen in a sealed reaction vessel under autogenous pressure.

precipitation from solution through the addition of ice and water to the pot products, and by a subsequent filtering, fragmentation, washing with water, further filtering and a subsequent drying of the solid copolymers under vacuum at about 50° C. The copolymers, when dried, are white, particulate materials. Using osmometric techniques it has been found that copolymers produced in this manner have number average molecular weights of about 10,000±2,000.

Example 16

Stock polyepoxide solutions 1 to 18 were prepared so as to contain 15% solids using Oxiron 2000 resin in cellosolve acetate (solution 1), diacetone alcohol (solution 2), and toluene (solution 3); Tipox B resin in methyl isobutyl ketone (solution 4), chloroform (solution 5) and Solvesso 150/Cellosolve acetate (in 9/1 wt./wt. ratio) (solution 6); Unox 221 resin in acetone (solution 7), cyclohexanone (solution 8) and methanol (solution 9); Kopoxite 159 resin in butyl Cellosolve acetate (solution 10), trichloroethylene (solution 11) and ethanol (solution 12); Ker 357 A resin in dimethyl formamide (solution 13), methylene chloride (solution 14) and xylol (solution 15) and Epoxol 9–5 resin in dioxane (solution 16), benzene (solution 17) and butyl acetate (solution 18).

Further, two stock solutions of a $VCL_2$/AA copolymer were prepared: Solution I contained 15% solids in tetrahydrofuran and Solution II contained 15% solids in a 1:1 mixture by weight of methyl ethyl ketone and ethyl acetate. The copolymer contained vinylidene chloride and acrylic acid in an 84.5/15.5 mol ratio and was made as in Examples 1 to 15.

Coating solutions A to R were then prepared by mixing together various weights of the stock polyepoxide and $VCL_2$/AA copolymer solutions according to the schedule

TABLE I

| Example | Charge | | Charge $VCl_2$/AA, Mol percent | Initiator | | Solvent | |
|---|---|---|---|---|---|---|---|
| | $VCl_2$, g. | AA, g. | | In Grams | Type | In ml. | Type |
| 1 | 63 | 25 | 65/35 | 2 | A | 150 | A |
| 2 | 73 | 17 | 75/25 | 2 | A | 150 | A |
| 3 | 155 | 29.6 | 80/20 | 4 | A | 240 | A |
| 4 | 78 | 14 | 80/20 | 2 | A | 150 | A |
| 5 | 78 | 14.4 | 80/20 | 2 | A | 150 | A |
| 6 | 3,220 | 496 | 83/17 | 30 | A | 6,000 | D |
| 7 | 161 | 25 | 83/17 | 4 | A | 300 | A |
| 8 | 161 | 24.5 | 83/17 | 4 | A | 300 | C |
| 9 | 161 | 24.5 | 83/17 | 4 | A | 300 | D |
| 10 | 161 | 24.5 | 83/17 | 6 | B | 300 | C |
| 11 | 161 | 24.5 | 83/17 | 6 | B | 300 | D |
| 12 | 83 | 10.8 | 85/15 | 2 | A | 150 | A |
| 13 | 83 | 10.8 | 85/15 | 2 | A | 150 | A |
| 14 | 171 | 17 | 88/12 | 4 | A | 300 | A |
| 15 | 87 | 7.2 | 90/10 | 2 | A | 150 | A |

TABLE II

| Example | Time, Hrs. | Reaction Temp., °C. | Conversion, Percent | $VCl_2$/AA, Mol Percent | Resin Product, g. eq. COOH/100 g. Resin |
|---|---|---|---|---|---|
| 1 | 5 | 60 | 57 | 72/28 | 0.32 |
| 2 | 4 | 60 | | 79/21 | 0.22 |
| 3 | 16 | 65 | 85 | 82/18 | 0.19 |
| 4 | 4 | 60 | 32 | 83/17 | 0.18 |
| 5 | 17 | 60 | 85 | 83/17 | 0.19 |
| 6 | 6 | 65 | 61 | 83.9/16.1 | 0.173 |
| 7 | 3 | 65 | 53 | 84/16 | 0.17 |
| 8 | 5 | 65 | 63 | 84/16 | 0.17 |
| 9 | 5 | 65 | 61 | 85/15 | 0.161 |
| 10 | 5 | 65 | 33 | 85/15 | 0.161 |
| 11 | 5 | 65 | 38 | 86/14 | 0.149 |
| 12 | 4 | 60 | 33 | 87/13 | 0.13 |
| 13 | 1 | 85 | 55 | 87/13 | 0.14 |
| 14 | 3 | 65 | 55 | 90.10 | 0.11 |
| 15 | 1 | 85 | 56 | 91/9 | 0.10 |

The resin products obtained were soluble in the pot product mixture. They were separated therefrom by in Table III below to produce solutions containing epoxide/carboxyl ratios in equivalents of 2, 1 and 0.5.

TABLE III

| Coating Solution Formed | Polyepoxide Solution Used | Grams of Polyepoxide Solution Used | VCl₂/AA Solution Used | Grams of VCl₂/AA Solution Used | Ratio Epoxide/Carboxyl Equivalents in the Coating Solutions |
|---|---|---|---|---|---|
| A | 1 | 60 | I | 100 | 2 |
| B | 2 | 30 | I | 100 | 1 |
| C | 3 | 15 | I | 100 | 0.5 |
| D | 4 | 64 | I | 100 | 2 |
| E | 5 | 32 | I | 100 | 1 |
| F | 6 | 16 | I | 100 | 0.5 |
| G | 7 | 44.6 | I | 100 | 2 |
| H | 8 | 22.3 | I | 100 | 1 |
| I | 9 | 11.2 | I | 100 | 0.5 |
| J | 10 | 43 | I | 100 | 2 |
| K | 11 | 21.5 | II | 100 | 1 |
| L | 12 | 10.75 | II | 100 | 0.5 |
| M | 13 | 66.6 | II | 100 | 2 |
| N | 14 | 33.3 | II | 100 | 1 |
| O | 15 | 16.7 | II | 100 | 0.5 |
| P | 16 | 5.9 | II | 100 | 2 |
| Q | 17 | 29.5 | II | 100 | 1 |
| R | 18 | 15 | II | 100 | 0.5 |

Polyolefinic substrates were coated with VCL₂/AA—polyepoxide solutions A to R prepared above. The substrates used were treated polypropylene sheeting and cast pieces of ethylene-propylene rubber which were dip coated with each of solutions A to R. The coatings were then dried and cured at room temperature, about 83° F. for 16 to 18 hours to form clear, firmly adherent films on the polyolefin substrates.

*Example 17*

In this example a coating solution comprising 10 parts by weight of a VCL₂/AA copolymer (having an 84.5/15.5 mol ratio and prepared as in Examples 1 to 15) 1.7 parts by weight of Tipox B resin and 33 parts by weight of each methyl ethyl ketone and ethyl acetate was knife coated onto several pieces of untreated, medium density polyethylene film (commercially used for bread wrapping) with a 0.003″ wet thickness Gardner knife. The pieces of polyethylene were then cured in several ways: (a) air dried and cured at room temperature (about 85° F.) for 20 minutes, and (b) air dried and cured at room temperature for 18 hours; (c) air dried and cured for 5 minutes at 85° F. and then for 2 minutes at 110° F.; (d) air dried for 5 minutes at 85° F. and then for 5 minutes at 110° F. All the resulting polyolefin based structures were smoothly coated with clear and strongly adherent films.

*Example 18*

Two stock solutions were prepared: Solution Y containing 15% solids of an (84.5/15.5 mol ratio) VCL₂/AA copolymer (prepared as in Examples 1 to 15) in tetrahydrofuran, and Solution Z being 45 g. of the epoxidized silicone oil Epoxy Silicone QZ8-0914 in 25 g. of toluene (this oil has an epoxide equivalent of 185). A coating solution was then prepared to contain a 1/1 ratio of equivalents of epoxide/carboxyl by mixing together 31 g. of Solution Z with 100 g. of Solution Y.

Samples of both treated polypropylene film and ethylene propylene rubber were then dipcoated with the coating solutions at room temperature and the resulting coatings were then cured in air for about 15 minutes at 78° F. to produce coated objects wherein the adhesion of the cured coating to the substrate would be described as good to excellent.

*Examples 19–23*

Coatings made in accordance with the practice of the present invention show unusual resistance to erosive abrasion, as shown in Table IV below. VCL₂/AA (84.5/15.5 mol ratio) copolymers (made as in Examples 1 to 15) and various polyepoxides were used with various solvents to make coating solutions which were applied to and cured on steel panels. The coatings thus obtained were then subjected to abrasion tests as described in ASTM procedure D1044-56.

| Example | 19 | 20 | 21 | 22 | 23 |
|---|---|---|---|---|---|
| Recipe, parts by weight: | | | | | |
| VCL₂/AA | 100 | 100 | 100 | 100 | 100 |
| Unox 201 resin | 13.5 | | | | |
| Unox 289 resin | | 17.3 | | | |
| Epoxol 9-5 resin | | | 14.5 | | |
| Epoxol EPO resin | | | | 16.8 | |
| Tipox B resin | | | | | 15.6 |
| THF/Toluene ¹ | 170.0 | 176.1 | 171.8 | 174.9 | 173.3 |
| COOH/Epoxide ratio in coating solution | 2 | 2 | 2 | 2 | 2 |
| Cure at 25° C., hrs | 3.5 | 3.5 | 3.5 | 3.5 | 3.5 |
| Cure at 150° C., min | 3.5 | 3.5 | 3.5 | 3.5 | 3.5 |
| Abrasion Resistance ² | 17.7 | 13.6 | 8.2 | 9.1 | 40.7 |

¹ Tetrahydrofuran/toluene solvent mixture, 1:1 by weight.
² Taber Abrader CS 10 wheel, 500 g. weight, 1,000 cycles.

*Example 24*

Coatings used in the practice of the present invention exhibit excellent resistance to attack by solvents and corrosive chemicals such as is shown in Table V below.

Coating solutions comprising 100 parts by weight of an 84.5/15.5 mol ratio, VCL₂/AA copolymer produced as in Examples 1 to 15, 80 parts by weight of Tipox A polyepoxide, 3 parts by weight of boron trifluoride monoethylamine and 183 parts by weight of methyl ethyl ketone were prepared, spread onto a glass cloth substrate and permitted to dry. Two layers of the thus coated substrate, with coated sides in face to face contact, were subjected to 1000 p.s.i. and 300° F. for one hour. The laminated product obtained had a resin content of 29% by weight; it was then immersed in various liquid solvents and corrosive chemicals for one week (7 days) at 70° F. The tests conducted are described in ASTM D543-56T procedure, and the results obtained are as listed in Table V.

TABLE V

| Immersion Medium | Cured Coating | |
|---|---|---|
| | Percent Weight Increase | Percent Thickness Increase |
| 30% H₂SO₄ | 1.42 | 5.86 |
| 3% H₂SO₄ | 0.94 | 6.72 |
| 10% NaOH | 0.51 | (¹) |
| 1% NaOH | 1.46 | 0.67 |
| 95% Ethanol | 2.84 | 7.46 |
| 50% Ethanol | 1.53 | (¹) |
| Acetone | 10.25 | 21.1 |
| Ethyl Acetate | 13.12 | 26.3 |
| Ethylene dichloride | 18.6 | 39 |
| CCl₄ | 0.533 | (¹) |
| Toluene | 3.45 | 7.86 |
| Heptane | 0.29 | (¹) |
| 10% NaCl | 0.97 | (¹) |
| Phenol | 6.5 | 12.3 |
| H₂O | 0.3 | (¹) |

¹ No change.

Examples 25 to 33

In Examples 25 to 33 coating solutions were prepared according to the recipes listed in Table VI by dissolving an 84.5/15.5 mol ratio $VCL_2/AA$ copolymer prepared as in Examples 1 to 15 in a 50:50 wt.:wt. ethylacetate:methyl ethyl ketone solvent system, and then dissolving therein the polyepoxides described. The coating solutions were then applied to the treated surface of polypropylene film. A Gardner 0.003" wet thickness doctor blade was used to set down the coatings. The coated polypropylene films were then placed in a forced draft oven to dry and cure at 250° F. for one minute. In Examples 26–33 the coated films were used with *no further treatment*.

Strips of the thus coated polypropylene were then paired and heat sealed using a Sentinel Laboratory Sealer Model 12 AS to effect a one-inch wide seal. In Examples 25 to 30 the surfaces placed in contact and sealed together were both "treated" and "coated" surfaces. In Examples 31 and 33 one of the surfaces is both "treated" and coated, and the other surface is "treated" but not coated. In Example 32 one of the surfaces in contact is both "treated" and coated, whereas the other surface is neither treated nor coated. The bond formed by the seals in all of the present examples was quite good, and in most instances excellent.

In Examples 25 and 30 to 33 a more quantitative estimate of the quality of the bond of the seals was obtained by using 1½ x 3" cured coated polypropylene film samples sealed along one 1½ inch wide edge for a depth of 1 inch. The samples were then pulled apart on an Instron tester using a crosshead speed of 2"/min. The chart result in lbs. was converted to the table value of g./width inch by the equation g./width inch = maximum lbs. pull x ⅔ in. x 454 g./lb.

The results obtained are also listed below.

contains an average of more than one epoxide group per molecule.

3. An article as in claim 1 in which said acid material is acrylic acid.

4. An article as in claim 1 in which said substrate is in the form of a film.

5. An article as in claim 1 in which said polyolefin is selected from the group consisting of homopolymers and copolymers of ethylene and propylene.

6. An article as in claim 5 in which said polyolefin is a homopolymer of ethylene.

7. An article as in claim 5 in which said polyolefin is a homopolymer of propylene.

8. An article as in claim 1 in which said polyepoxide is selected from the group consisting of epoxidized polybutadienes, polymers of glycidyl acrylates, bisphenol A/epichlorohydrin reaction products, cyclo aliphatic polyepoxides, resorcinol diglycidyl ether polyepoxides, novalak polyepoxides, epoxidized fatty acids, and epoxidized silicone oils.

9. A process for coating a polyolefin substrate comprising applying to at least one surface of said substrate a solution containing
   (A) at least one copolymer essentially consisting of about 75 to 95 mol percent of vinylidene chloride and about 5–25 mol percent of at least one acid material selected from the group consisting of $\alpha,\beta$-olefinically unsaturated, aliphatic carboxylic acids and their anhydrides and
   (B) at least one polyepoxide in an amount such as to provide about 0.01 to 2.5 mols of epoxide groups per mol of carboxyl groups present in said copolymer,
removing the solvent medium from said solution, and crosslinking said copolymer with said polyepoxide whereby said crosslinked copolymer forms a coating on said substrate.

TABLE VI

| Example | 25 | 26 | 27 | 28 | 29 | 30 | 31 | 32 | 33 |
|---|---|---|---|---|---|---|---|---|---|
| Recipe, parts by weight: | | | | | | | | | |
| VCL₂/AA copolymer | 210.0 | 10.0 | 10.0 | 10.0 | 10.0 | 10.0 | 10.0 | 10.0 | 10.0 |
| Tipox B polyepoxide | 35.7 | 1.7 | 1.7 | 1.7 | 1.7 | 1.7 | 1.7 | 1.7 | |
| Flexol EPO polyepoxide | | | | | | | | | 1.8 |
| Methyl ethyl ketone | 693.0 | 33.0 | 33.0 | 33.0 | 33.0 | 33.0 | 33.0 | 33.0 | 33.0 |
| Ethyl acetate | 693.0 | 33.0 | 33.0 | 33.0 | 33.0 | 33.0 | 33.0 | 33.0 | 33.0 |
| Percent solids of resulting solutions | 15.0 | 15.0 | 15.0 | 15.0 | 15.0 | 15.0 | 15.0 | 15.0 | 15.0 |
| Epoxide/carboxyl ratio, equivalents | 0.5 | 0.5 | 0.5 | 0.5 | 0.5 | 0.5 | 0.5 | 0.5 | 0.5 |
| Substrate 1, surface used in seal contact [1] | T/C [2] | | | | | | | | |
| Substrate 2, surface used in seal contact [3] | T/C | | | | | | | | |
| Substrate 3, surface used in seal contact [3] | | T/C | T/C | T/C | T/C | T/C | T/C | T/C | T/C |
| Substrate 4, surface used in seal contact [3] | | T/C | T/C | T/C | T/C | T/C | T/NC | UT/NC | T/NC |
| Heat Seal: | | | | | | | | | |
| Temperature, °F | 280 | 210 | 250 | 190 | 230 | 220 | 190 | 190 | 190 |
| Contact time of substrate surfaces, sec. | 4 | 3.5 | 0.5 | 4 | 1 | 1.5 | 10 | 10 | 10 |
| Contact pressure, p.s.i | 30 | 25 | 25 | 25 | 25 | 25 | 15 | 15 | 15 |
| Seal Bond | Excellent | Excellent | Excellent | Excellent | Excellent | Excellent | Excellent | Excellent | Good |
| Peel bond strength, g./width inch | 332 | | | | | | 235 | 162 | 248 | 98 |

[1] Oriented polypropylene film sold as "U Del" film by Union Carbide Corp.; 0.001" x 20" (thickness x width) treated on one side only.
[2] T = treated, C = coated, UT = untreated, NC = not coated.
[3] Oriented polypropylene film sold as "PRX T-1" by Hercules Powder Co. 0.001" x 20" (thickness x width) treated on one side only.

I claim:

1. As an article of manufacture, a polyolefin substrate coated on at least one surface thereof with the reaction product of
   (A) at least one copolymer essentially consisting of about 75 to 95 mol percent of vinylidene chloride and about 5 to 25 mol percent of at least one acid material selected from the group consisting of $\alpha,\beta$-olefinically unsaturated, aliphatic carboxylic acids and their anhydrides and
   (B) at least one polyepoxide in an amount such as to provide about 0.01 to 2.5 mols of epoxide groups per mol of carboxyl groups present in said copolymer.

2. An article as in claim 1 in which said polyepoxide

10. A plurality of polyolefin substrates bonded together by the reaction product of
    (A) at least one copolymer essentially consisting of about 75 to 95 mol percent of vinylidene chloride and about 5 to 25 mol percent of at least one acid material selected from the group consisting of $\alpha,\beta$-olefinically unsaturated, aliphatic carboxylic acids and their anhydrides and
    (B) at least one polyepoxide in an amount such as to provide about 0.01 to 2.5 mols of epoxide groups per mol of carboxyl groups present in said copolymer.

11. A process for bonding polyolefin substrates together comprising applying to at least one of the surfaces of each pair of surfaces of said substrates that are to be bonded together a heat sealable coating composition which is the reaction product of
  (A) at least one copolymer essentially consisting of about 75 to 95 mol percent of vinylidene chloride and about 5 to 25 mol percent of at least one acid material selected from the group consisting of α,β-olefinically unsaturated, aliphatic carboxylic acids and their anhydrides and
  (B) at least one polyepoxide in an amount such as to provide about 0.01 to 2.5 mols of epoxide groups per mol of carboxyl groups present in said copolymer, facing together each of said pair of surfaces that are to be bonded to one another and subjecting said faced surfaces to sufficient heat and pressure as to cause said surfaces to bond together.

References Cited by the Examiner

UNITED STATES PATENTS

| | | | |
|---|---|---|---|
| 2,925,403 | 2/1960 | Shokal | 260—47 |
| 2,928,948 | 3/1960 | Silversher | 250—108 |
| 2,968,576 | 1/1961 | Keller et al. | 117—47 |
| 2,994,632 | 8/1961 | Brown et al. | 161—218 |
| 3,008,914 | 11/1961 | Fry | 260—33.4 |
| 3,031,332 | 4/1962 | Rothacker | 264—25 |
| 3,046,246 | 7/1962 | Muskat | 260—837 |
| 3,207,718 | 9/1965 | Zimmerman et al. | 260—836 X |
| 3,208,894 | 9/1965 | Yanagihara et al. | 156—332 X |

EARL M. BERGERT, *Primary Examiner.*

L. T. PIRKEY, H. ANSHER, *Assistant Examiners.*